United States Patent
Yamada

(10) Patent No.: US 10,858,527 B2
(45) Date of Patent: Dec. 8, 2020

(54) COMPOSITION, CURED PRODUCT, IMAGE FORMING APPARATUS, AND IMAGE FORMING METHOD

(71) Applicant: Hiroaki Yamada, Chiba (JP)

(72) Inventor: Hiroaki Yamada, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 39 days.

(21) Appl. No.: 16/018,509

(22) Filed: Jun. 26, 2018

(65) Prior Publication Data

US 2019/0023924 A1    Jan. 24, 2019

(30) Foreign Application Priority Data

Jul. 19, 2017 (JP) .................................. 2017-139922
May 17, 2018 (JP) .................................. 2018-095703

(51) Int. Cl.

| | |
|---|---|
| *C09D 11/38* | (2014.01) |
| *B41J 2/17* | (2006.01) |
| *B41J 2/45* | (2006.01) |
| *C08F 20/56* | (2006.01) |
| *C09D 11/101* | (2014.01) |
| *C09D 11/106* | (2014.01) |
| *C08F 2/48* | (2006.01) |

(52) U.S. Cl.
CPC .................. *C09D 11/38* (2013.01); *B41J 2/17* (2013.01); *B41J 2/45* (2013.01); *C08F 20/56* (2013.01); *C09D 11/101* (2013.01); *C09D 11/106* (2013.01); *C08F 2/48* (2013.01)

(58) Field of Classification Search
CPC . C09D 11/38; C08F 2/48; C08F 20/56; C08F 120/58; C08F 120/60; C08F 220/58; C08F 220/60; C08F 220/603; B41J 2/01; B41J 2/21; B41J 2/17506; B41J 11/002; B41J 2/17; B41J 2/45; B41M 7/0081; C08D 11/101
See application file for complete search history.

(56) References Cited

U.S. PATENT DOCUMENTS

| | | | |
|---|---|---|---|
| 4,159,383 A * | 6/1979 | Culbertson | ............. C08F 20/58 560/125 |
| 4,292,152 A | 9/1981 | Lechtken et al. | |
| 4,298,738 A | 11/1981 | Lechtken et al. | |
| 4,324,744 A | 4/1982 | Lechtken et al. | |

(Continued)

FOREIGN PATENT DOCUMENTS

| | | |
|---|---|---|
| CN | 102134418 A | 7/2011 |
| CN | 104231744 A | 12/2014 |

(Continued)

OTHER PUBLICATIONS

Extended European Search Report dated Oct. 11, 2018 in corresponding European Patent Application No. 18182575.3 6 pages.

(Continued)

*Primary Examiner* — Sanza L. McClendon
(74) *Attorney, Agent, or Firm* — Oblon, McClelland, Maier & Neustadt, L.L.P.

(57) ABSTRACT

A composition comprising an acrylamide compound (A1) having an ester structure and a molecular weight of from 150 to 200 and an acylphosphine oxide polymerization initiator (B1) is provided.

14 Claims, 2 Drawing Sheets

(56) References Cited

U.S. PATENT DOCUMENTS

| | | | |
|---|---|---|---|
| 4,385,109 A | 5/1983 | Lechtken et al. | |
| 4,710,523 A | 12/1987 | Lechtken et al. | |
| 5,719,202 A * | 2/1998 | Share | C07D 295/185 522/10 |
| 10,280,319 B2 * | 5/2019 | Morita | C07D 295/215 |
| 2011/0183081 A1 * | 7/2011 | Nakane | B41M 5/0023 427/511 |
| 2012/0147103 A1 | 6/2012 | Hasegawa et al. | |
| 2012/0200648 A1 | 8/2012 | Hiraoka et al. | |
| 2012/0293589 A1 | 11/2012 | Hiraoka | |
| 2013/0144057 A1 * | 6/2013 | Morita | C09D 11/101 544/172 |
| 2013/0321539 A1 | 12/2013 | Hiraoka | |
| 2014/0125744 A1 | 5/2014 | Hiraoka | |
| 2014/0139596 A1 | 5/2014 | Hiraoka | |
| 2014/0139597 A1 | 5/2014 | Hiraoka | |
| 2014/0311380 A1 | 10/2014 | Hiraoka | |
| 2014/0327719 A1 | 11/2014 | Hiraoka | |
| 2014/0336298 A1 | 11/2014 | Hiraoka | |
| 2014/0363634 A1 | 12/2014 | Morita et al. | |
| 2015/0009265 A1 | 1/2015 | Kohzuki et al. | |
| 2015/0210876 A1 | 7/2015 | Amao | |
| 2016/0075894 A1 | 3/2016 | Noguchi et al. | |
| 2016/0347960 A1 | 12/2016 | Morita et al. | |
| 2017/0008325 A1 | 1/2017 | Hiraoka et al. | |
| 2017/0137644 A1 | 5/2017 | Morita et al. | |
| 2017/0183519 A1 | 6/2017 | Morita et al. | |
| 2017/0253680 A1 | 9/2017 | Yamada | |
| 2017/0327705 A1 | 11/2017 | Yamada | |
| 2018/0127607 A1 | 5/2018 | Morita et al. | |

FOREIGN PATENT DOCUMENTS

| | | |
|---|---|---|
| CN | 108059878 A | 5/2018 |
| EP | 3 321 333 A1 | 5/2018 |
| JP | 63-040799 | 8/1988 |
| JP | 2011-148918 | 8/2011 |
| JP | 2013-202937 | 10/2013 |
| JP | 2015-013980 | 1/2015 |

OTHER PUBLICATIONS

Office Action dated Jun. 8, 2020 in Chinese Patent Application No. CN201810755446.3.

Wei Zhongcheng, Optical Fibre Material Preparation Technology, Beijing University of Posts and Telecommunications Press, Sep. 30, 2016 (w/ English translation).

\* cited by examiner

COMPOSITION, CURED PRODUCT, IMAGE FORMING APPARATUS, AND IMAGE FORMING METHOD

CROSS-REFERENCE TO RELATED APPLICATIONS

This patent application is based on and claims priority pursuant to 35 U.S.C. § 119(a) to Japanese Patent Application Nos. 2017-139922 and 2018-095703, filed on Jul. 19, 2017 and May 17, 2018, respectively, in the Japan Patent Office, the entire disclosure of each of which is hereby incorporated by reference herein.

BACKGROUND

Technical Field

The present disclosure relates to a composition, a cured product, an image forming apparatus, and an image forming method.

Description of the Related Art

As active energy ray curable inks for use in inkjet recording, radical polymerizable inks and cationic polymerizable inks are known. Radical polymerizable inks are more widely used for their production cost and storage stability.

As an example of active energy ray curable radical polymerizable inks, an ink comprising a polymerizable monomer, such as an acrylic acid ester, and a polymerization initiator that generates radicals upon irradiation with an active energy ray is known.

SUMMARY

In accordance with some embodiments of the present invention, a composition comprising an acrylamide compound (A1) having an ester structure and a molecular weight of from 150 to 200 and an acylphosphine oxide polymerization initiator (B1) is provided.

In accordance with some embodiments of the present invention, a cured product obtained by curing the above-described composition is provided.

In accordance with some embodiments of the present invention, an image forming apparatus is provided. The image forming apparatus includes a storing part storing the above-described composition, a discharger to discharge the composition, and an irradiator to irradiate the discharged composition with an active energy ray.

In accordance with some embodiments of the present invention, an image forming method is provided. The image forming method includes the processes of discharging the above-described composition and curing the discharged composition by irradiating the discharged composition with an active energy ray.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
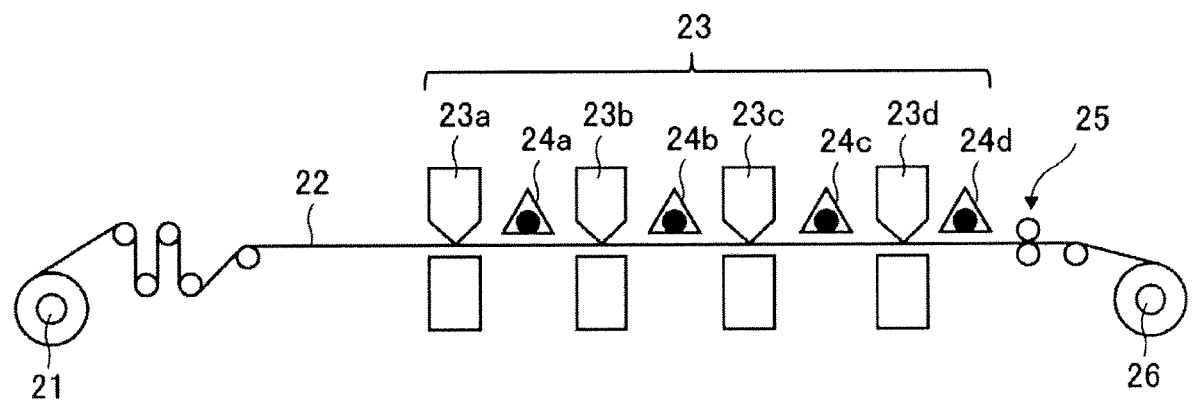
FIG. 1 is a schematic diagram illustrating an image forming apparatus according to an embodiment of the present invention, equipped with an inkjet discharging device.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

When a monomer having a large molecular weight is served as a polymerizable monomer, an odor generally peculiar to polymerizable monomers is suppressed, but curability of such a monomer is poor upon active energy ray irradiation. In addition, when the active energy ray irradiation is performed by ultraviolet light-emitting diode that emits ultraviolet rays having a peak wavelength of 395 nm, both curability of the monomer and strength of the cured product may be poor.

In accordance with some embodiments of the present invention, a composition is provided that provides less odor, excellent curability upon active energy ray irradiation, and excellent strength in the cured product thereof.

Composition

The composition according to an embodiment of the present invention comprises a polymerizable acrylamide compound (A1) and an acylphosphine oxide polymerization initiator (B1). The composition may further optionally comprise a polymerizable compound (A2) other than the polymerizable acrylamide compound (A1), a polymerization initiator (B2) other than the acylphosphine oxide polymerization initiator (B1), a colorant, an organic solvent, and other components. Preferably, the composition is an active energy ray curable composition, but is not limited thereto. In the following descriptions, the composition may also be referred to as "active energy ray curable composition".

Acrylamide Compound (A1)

The acrylamide compound (A1) refers to a polymerizable monomer having an acrylamide group and an ester structure, serving as one component of the active energy ray curable composition.

The acrylamide group is a polymerizable group in which acryloyl group ($CH_2=CH—CO—$ is bound to the nitrogen atom of an amine compound. The acrylamide compound (A1) may be obtained by, for example, reacting a compound having an activated acryloyl group, such as acrylic acid chloride and acrylic acid anhydride, with an amine compound. The amine compound used to obtain the acrylamide compound (A1) may be either a primary amine or a secondary amine, and a secondary amine is more preferable since it results in a tertiary amide that generates no hydrogen bond between amide groups, which is advantageous in reducing viscosity.

Preferably, the ester structure in the acrylamide compound (A1) is a straight-chain or branched alkyl ester group having 1 to 4 carbon atoms. A straight-chain or branched alkyl group having 1 to 4 carbon atoms is included in the alkyl ester group. Specific examples thereof include, but are not limited to, methyl group, ethyl group, propyl group, isopropyl group, butyl group, sec-butyl group, isobutyl group, and tert-butyl group. Among these, methyl group, ethyl group, and tert-butyl group are preferable, and methyl group and ethyl group are more preferable.

Preferably, the acrylamide compound (A1) is a compound represented by the following formula (1) or (2).

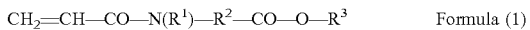

$$CH_2=CH—CO—N(R^1)—R^2—CO—O—R^3 \quad \text{Formula (1)}$$

In the formula (1), $R^1$ represents a hydrogen atom or a straight-chain or branched alkyl group having 1 to 4 carbon atoms. Preferably, $R^1$ is a straight-chain or branched alkyl group having 1 to 4 carbon atoms. Specific examples of R' include, but are not limited to, methyl group, ethyl group, propyl group, isopropyl group, butyl group, sec-butyl group, isobutyl group, and tert-butyl group.

In the formula (1), $R^2$ represents a straight-chain or branched alkylene group having 1 to 4 carbon atoms. Specific examples of $R^2$ include, but are not limited to, methylene group, ethane-1,1-diyl group, ethane-1,2-diyl group, propane-1,1-diyl group, propane-1,2-diyl group, propane-1,3-diyl group, butane-1,1-diyl group, butane-1,2-diyl group, butane-1,3-diyl group, butane-1,4-diyl group, 2-methylpropane-1,1-diyl group, 2-methylpropane-1,2-diyl group, and 2-methylpropane-1,3-diyl group.

In the formula (1), $R^3$ represents a straight-chain or branched alkyl group having 1 to 4 carbon atoms. Specific examples of $R^3$ include, but are not limited to, methyl group, ethyl group, propyl group, isopropyl group, butyl group, sec-butyl group, isobutyl group, and tert-butyl group. Among these, methyl group, ethyl group, and tert-butyl group are preferable, and methyl group and ethyl group are more preferable.

In the formula (1), a combination in which $R^1$ is methyl group, $R^2$ is methylene group, and $R^3$ is methyl group or ethyl group is preferred.

Preferably, a total number of carbon atoms in $R^2$, and $R^3$ is in a range of from 2 to 6.

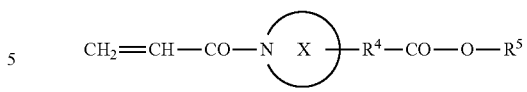

In the formula (2), a ring X represents a cyclic structure comprising a nitrogen atom and 2 to 5 carbon atoms. Specific examples of the ring X include, but are not limited to, aziridine, azetidine, pyrrolidine, and piperidine. Among these, pyrrolidine and piperidine are preferable.

In the formula (2), $R^4$ represents a single bond or a straight-chain or branched alkylene group having 1 to 3 carbon atoms. Specific examples of $R^4$ include, but are not limited to, a single bond, methylene group, ethane-1,1-diyl group, ethane-1,2-diyl group, propane-1,1-diyl group, propane-1,2-diyl group, and propane-1,3-diyl group.

In the formula (2), $R^5$ represents a straight-chain or branched alkyl group having 1 to 3 carbon atoms. Specific examples of $R^5$ include, but are not limited to, methyl group, ethyl group, propyl group, and isopropyl group.

Preferably, a total number of carbon atoms in the ring X, $R^4$, and $R^5$ is in a range of from 3 to 6.

Specific preferred examples of the compound represented by the formula (1) or (2) include, but are not limited to, N-acryloyl-N-alkylamino acid alkyl ester (including N-acryloylproline alkyl ester) and N-acryloylpiperidine carboxylic acid alkyl ester. In this paragraph, an alkyl refers to a straight-chain or branched alkyl having 1 to 4 carbon atoms, and an alkyl having 1 or 2 carbon atoms (i.e., methyl or ethyl) is preferred as the alkyl.

Specific examples of the N-acryloyl-N-alkylamino acid alkyl ester include, but are not limited to, N-acryloyl-N-methylglycine methyl ester, N-acryloyl-N-methylglycine ethyl ester, N-acryloyl-N-methylglycine propyl ester, N-acryloyl-N-methylglycine butyl ester, N-acryloyl-N-ethylglycine methyl ester, N-acryloyl-N-ethylglycine ethyl ester, N-acryloyl-N-ethylglycine propyl ester, N-acryloyl-N-propylglycine methyl ester, N-acryloyl-N-propylglycine ethyl ester, N-acryloyl-N-butylglycine methyl ester, N-acryloyl-N-methylalanine methyl ester, N-acryloyl-N-methylalanine ethyl ester, N-acryloyl-N-methylalanine propyl ester, N-acryloyl-N-ethylalanine methyl ester, N-acryloyl-N-ethylalanine ethyl ester, N-acryloyl-N-propylalanine methyl ester, N-acryloyl-N-methyl-β-alanine methyl ester, N-acryloyl-N-methyl-β-alanine ethyl ester, N-acryloyl-N-ethyl-β-alanine methyl ester, N-acryloyl-N-ethyl-β-alanine ethyl ester, N-acryloyl-N-methylvaline methyl ester, N-acryloylproline methyl ester, and N-acryloylproline ethyl ester.

Specific examples of the N-acryloylpiperidine carboxylic acid alkyl ester include, but are not limited to, methyl N-acryloylpiperidine-2-carboxylate, methyl N-acryloylpiperidine-3-carboxylate, and methyl N-acryloylpiperidine-4-carboxylate.

The acrylamide compound (A1) has a molecular weight of from 150 to 200. When the molecular weight is less than 150, an odor may be exhibited due to volatilization of the compound or inkjet discharge stability may be poor, which is not preferable. When the molecular weight is in excess of 200, curability of the composition and strength of the cured product of the composition may deteriorate, and there is a concern that viscosity of the compound or composition is increased.

To be applied to inkjet recording processes, preferably, the acrylamide compound (A1) is a colorless or light-yellow, transparent liquid having a low viscosity (100 mPa·s or less) at normal temperature (25° C.). In addition, for user safety, the acrylamide compound (A1) preferably exhibits no strong acidic or basic property and contains no formaldehyde, which is toxic, as impurity. Furthermore, the acrylamide compound (A1) preferably has a proper degree of polarity for uniformly dissolving the acylphosphine oxide polymerization initiator (B1) used in combination, to contribute to improvements of properties of the cured product. Moreover, the acrylamide compound (A1) preferably has a molecular weight of from 150 to 200, for the reason described above.

Various types of acrylamide compounds having a polymerizable acrylamide group and no ester structure (such as N-acryloylmorpholine, N,N-dimethylacrylamide, N,N-diethylacrylamide, N-isopropylacrylamide, N-(2-hydroxyethyl)acrylamide, N-(hydroxymethyl)acrylamide, N-(butoxymethyl)acrylamide, N-[3-(dimethylamino)propyl]acrylamide, N-(1,1-dimethyl-3-oxobutyl)acrylamide, and 2-acrylamide-2-methylpropanesulfonic acid) are commercially available. However, it is difficult to find out those meeting all of the above-described requirements (i.e., viscosity, hue, safety, polarity, and molecular weight). On the other hand, it has been found that the acrylamide compound (A1) according to the present embodiment, that has a neutral ester structure having a proper degree of polarity, meets these requirements.

Preferably, a mass content of the acrylamide compound (A1) is from 20.0% to 98.0%, more preferably from 40.0% to 97.0%, and most preferably from 60.0% to 96.0%, based on a total mass of the composition. The acrylamide compound (A1) may comprise a single material or two or more materials.

Acylphosphine Oxide Polymerization Initiator (B1)

Specific preferred examples of the acylphosphine oxide polymerization initiator (B1) include, but are not limited to, compounds described in JP-63-40799-B. Examples of the compounds described in JP-63-40799-B include the following compounds (1) to (21).

(1) An acylphosphine oxide compound represented by the following formula (I):

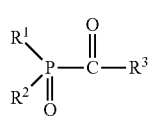

(I)

where $R^1$ represents a lower alkyl group, a lower alkoxy group, or a phenyl group that may be substituted with a lower alkyl group; $R^2$ represents a lower alkyl group, or a phenyl group that may be substituted with a lower alkyl group; and $R^3$ represents a straight-chain or branched alkyl group having 2 to 18 carbon atoms that may be substituted with acetyloxy group, a cycloalkyl group having 3 to 12 carbon atoms, an aryl group that may be substituted with a lower alkyl group, a lower alkoxy group, or a halogen atom, or an atomic group represented by the following formula:

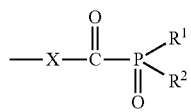

where $R^1$ and $R^2$ are the same as described above and X represents p-phenylene group.

(2) The acylphosphine oxide compound of above (1), wherein $R^3$ is a tertiary alkyl group.

(3) The acylphosphine oxide compound of above (1), wherein $R^3$ is a mono-, di-, or tri-lower-alkyl-substituted phenyl group.

(4) The acylphosphine oxide compound of above (1), wherein $R^3$ is a di-substituted phenyl group in which at least two carbon atoms adjacent to the position binding to carbonyl group have substituents A and B where each of A and B independently represents a lower alkyl group, a lower alkoxy group, or a halogen atom; α-naphthyl group substituted with the substituents A and B at 2,8-position; or β-naphthyl group substituted with the substituents A and B at 1,3-position.

(5) The acylphosphine oxide compound of above (4), wherein $R^3$ is 2,4,6-trimethylphenyl group, 2,3,6-trimethylphenyl group, 2,6-dimethoxyphenyl group, 2,6-dichlorophenyl group, or 2,3,5,6-tetramethylphenyl group.

(6) The acylphosphine oxide compound of above (4), wherein $R^3$ is 1,3-dimethyl-naphthalene-2 group; 2,8-dimethyl-naphthalene-1 group; 1,3-dimethoxy-naphthalene-2 group; or 2,8-dimethoxynaphthalene-1 group.

(7) The acylphosphine oxide compound of any one of above (4) to (6), wherein $R^1$ and $R^2$ are phenyl group or a lower-alkyl-substituted phenyl group.

As described in page 12 (page 326), lines 24-44 of JP-63-40799-B, the above-described compounds may be used in combination with monomers depending on the type of polymer binder to be used in combination. For example, when these compounds are mixed with an unsaturated polyester resin, allyl compounds having at least two or three double bonds are preferably used in combination, such as dialkyl ester maleate, allyl acrylate, diallyl phthalate, di- or tri-allyl ester of trimellitic acid, ethylene glycol bisallyl carbonate, di- or poly-acrylate and di- or poly-methacrylate obtainable by esterification of diol or polyol with acrylic acid or methacrylic acid. Specific examples thereof include di- or tri-acrylate and di- or tri-methacrylate of ethylene glycol, diethylene glycol, triethylene glycol, polyethylene glycol having a molecular weight of up to about 500, 1,2-propanediol, 1,3-propanediol, neopentyl glycol (2,2-dimethylpropanediol), 1,4-butanediol, 1,1,1-trimethylolpropane, glycerin, and pentaerythritol.

Preferably, the acylphosphine oxide polymerization initiator (B1) comprises at least one of phenylbis(2,4,6-trimethylbenzoyl)phosphine oxide (e.g., IRGACURE 819 available from BASF Japan Ltd.) and diphenyl(2,4,6-trimethylbenzoyl)phosphine oxide (e.g., IRGACURE TPO available from BASF Japan Ltd.). In the present disclosure, a polymerization initiator may also be simply referred as an initiator.

Preferably, a mass content of the acylphosphine oxide polymerization initiator (B1) is from 1.0% to 20.0%, more preferably from 3.0% to 15.0%, based on a total mass of the composition. The acylphosphine oxide polymerization initiator (B1) may comprise a single material or two or more materials.

Preferably, a mass content of the acrylamide compound (A1) is from 5.0 to 30.0 times a mass content of the acylphosphine oxide polymerization initiator (B1).

By combining the acrylamide compound (A1) having a molecular weight of from 150 to 200 and the acylphosphine oxide polymerization initiator (B1), an active energy ray curable composition is provided that provides less odor, excellent curability upon irradiation with ultraviolet rays having a peak wavelength of 395 nm, and excellent strength in the cured product thereof.

Polymerizable Compound (A2) Other than Acrylamide Compound (A1)

Examples of the polymerizable compound (A2) other than the acrylamide compound (A1) include known polymerizable monomers such as (meth)acrylic acid esters. Specific examples thereof include, but are not limited to, methyl (meth)acrylate, ethyl (meth)acrylate, n-butyl (meth)acrylate, allyl (meth)acrylate, glycidyl (meth)acrylate, 2-(dimethylamino)ethyl (meth)acrylate, 2-hydroxyethyl (meth)acrylate, 2-butoxyethyl (meth)acrylate, ethyl carbitol (meth)acrylate, cyclohexyl (meth)acrylate, tetrahydrofurfuryl (meth)acrylate, 2-(2-vinyloxyethoxy)ethyl (meth)acrylate, benzyl (meth)acrylate, 2-phenoxyethyl (meth)acrylate, 2-hydroxy-3-phenoxypropyl (meth)acrylate, isobornyl (meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, neopentyl glycol di(meth)acrylate, ethoxylated neopentyl glycol di(meth)acrylate, propoxylated neopentyl glycol di(meth)acrylate, 1,6-hexanediol di(meth)acrylate, 1,9-nonanediol di(meth)acrylate, pentaerythritol tri(meth)acrylate, pentaerythritol tetra(meth)acrylate, dipentaerythritol hexa(meth)acrylate, and trimethylolpropane tri(meth)acrylate. In the present disclosure, "(meth)acrylic acid ester" refers to "acrylic acid ester or methacrylic acid ester". Similarly, "(meth)acrylate" also refers to "acrylic acid ester or methacrylic acid ester".

Examples of the polymerizable compound (A2) other than the acrylamide compound (A1) further include a urethane (meth)acrylate derivative obtained by reacting a (meth)acrylic acid ester having hydroxyl group with a compound having isocyanate group, and an epoxy (meth)acrylate derivative obtained by reacting a (meth)acrylic acid with a compound having epoxy group.

In addition to these (meth)acrylic acid derivatives, the following compounds may also be used: N-vinyl compounds such as N-vinylcaprolactam, N-vinylpyrrolidone, and N-vinylformamide; aromatic vinyl compounds such as styrene and α-methylstyrene; vinyl ethers such as diethylene glycol divinyl ether, tri ethylene glycol divinyl ether, and cyclohexanedimethanol divinyl ether; and allyl compounds such as allyl glycidyl ether, diallyl phthalate, and triallyl trimellitate.

The above-described acrylamide compound having no ester structure may also be used as the polymerizable compound (A2).

Preferably, a mass content of the polymerizable compound (A2) other than the acrylamide compound (A1) is from 1.0% to 60.0%, more preferably from 5.0% to 40.0%, based on a total mass of the composition. The polymerizable compound (A2) other than the acrylamide compound (A1) may comprise a single material or two or more materials.

By using the polymerizable compound (A2) in combination with the acrylamide compound (A1), curability and viscosity of the composition and hardness and adhesiveness of the cured product are easily controllable according to the intended purpose. Polymerization Initiator (B2) other than Acylphosphine Oxide Polymerization Initiator (B1)

Examples of the polymerization initiator (B2) other than the acylphosphine oxide polymerization initiator (B1) include known compounds capable of accelerating polymerization of polymerizable monomers upon active energy ray irradiation. Specific examples thereof include, but are not limited to: α-aminoketone polymerization initiators such as 2-methyl-1-[4-(methylthio)phenyl]-2-morpholinopropane-1-one and 2-(dimethylamino)-2-[(4-methylphenyl)methyl]-1-(4-morpholinophenyl)butane-1-one; α-hydroxyketone polymerization initiators such as 1-hydroxycyclohexyl phenyl ketone and 1-[4-(2-hydroxyethoxy)phenyl]-2-hydroxy-2-methylpropane-1-one; oxime ester polymerization initiators such as 1-[4-(phenylthio)phenyl]octane-1,2-dione-2-(o-benzoyloxime) and 1-[9-ethyl-6-(2-methylbenzoyl)-9H-carbazole-3-yl]ethanone-o-acetyloxime; thioxanthone polymerization initiators such as 2,4-diethylthioxanthone and 2-isopropylthioxanthone; benzophenone polymerization initiators such as benzophenone and 4,4'-bis(diethylamino)benzophenone; and acridone polymerization initiators such as 10-butyl-2-chloro-9(10H)-acridone.

Preferably, a mass content of the polymerization initiator (B2) other than the acylphosphine oxide polymerization initiator (B1) is from 0.1% to 10.0%, more preferably from 0.5% to 5.0%, based on a total mass of the composition. The polymerization initiator (B2) other than the acylphosphine oxide polymerization initiator (B1) may comprise a single material or two or more materials.

By using the polymerization initiator (B2) in combination with the acylphosphine oxide polymerization initiator (B1), curability and viscosity of the composition and hardness and adhesiveness of the cured product are easily controllable according to the intended purpose. It is particularly advantageous to use the polymerization initiator (B2) in combination with the acylphosphine oxide polymerization initiator (B1) in a case of using a light source other than that emitting ultraviolet rays having a peak wavelength of 395 nm.

Colorant

The active energy ray curable composition according to the present embodiment may contain a colorant. As the colorant, various pigments and dyes may be used that impart black, white, magenta, cyan, yellow, green, orange, or gloss color such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% to 20% by mass relative to the total mass (100% by mass) of the composition. Alternatively, the active energy ray curable composition may contain no colorant to be colorless and transparent. In this case, the active energy ray curable composition is preferably used for an overcoat layer for protecting an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

Organic Solvent

The active energy ray curable composition of the present embodiment optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1% by mass.

Other Components

The active energy ray curable composition of the present embodiment optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, and thickeners.

Preparation of Active Energy Ray Curable Composition

The active energy ray curable composition of the present embodiment can be prepared by using the components described above. The preparation devices and conditions are not particularly limited. For example, the curable composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization inhibitor, a surfactant, etc.

Viscosity

The viscosity of the active energy ray curable composition of the present embodiment has no particular limit because it can be adjusted depending on the purpose and application devices. For example, if an ejecting device that ejects the composition from nozzles is employed, the viscosity thereof is preferably in the range of 3 to 40 mPa·s, more preferably 5 to 15 mPa·s, and particularly preferably 6 to 12 mPa·s in the temperature range of 20° C. to 65° C., preferably at 25° C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1°34'×R24) at a number of rotation of 50 rpm with a setting of the temperature of hemathermal circulating water in the range of 20° C. to 65° C. VISCOMATE VM-150III can be used for the temperature adjustment of the circulating water.

Active Energy Ray

Specific examples of the active energy ray for curing the active energy ray curable composition include, but are not limited to, ultraviolet rays, electron beams, α-rays, β-rays, γ-rays, and X-rays, which are capable of imparting energy required to proceed polymerization of polymerizable components in the composition. In particular, ultraviolet rays having a peak wavelength of 395 nm emitted from a ultraviolet light-emitting diode ("UV-LED") is preferable.

From the viewpoint of productivity, it is preferable that the active energy ray curable composition is curable upon irradiation with ultraviolet rays having a peak wavelength of 395 nm in an amount of 1.0 $J/cm^2$ or less, more preferably 0.8 $J/cm^2$ or less, and most preferably 0.6 $J/cm^2$ or less.

Application Field

The application field of the active energy ray curable composition of the present embodiment is not particularly limited. It can be applied to any field where active energy ray curable compositions are used. For example, the active energy ray curable composition is selected to a particular application and used for a resin for processing, a paint, an adhesive, an insulant, a releasing agent, a coating material, a sealing material, various resists, and various optical materials.

Figure 2:
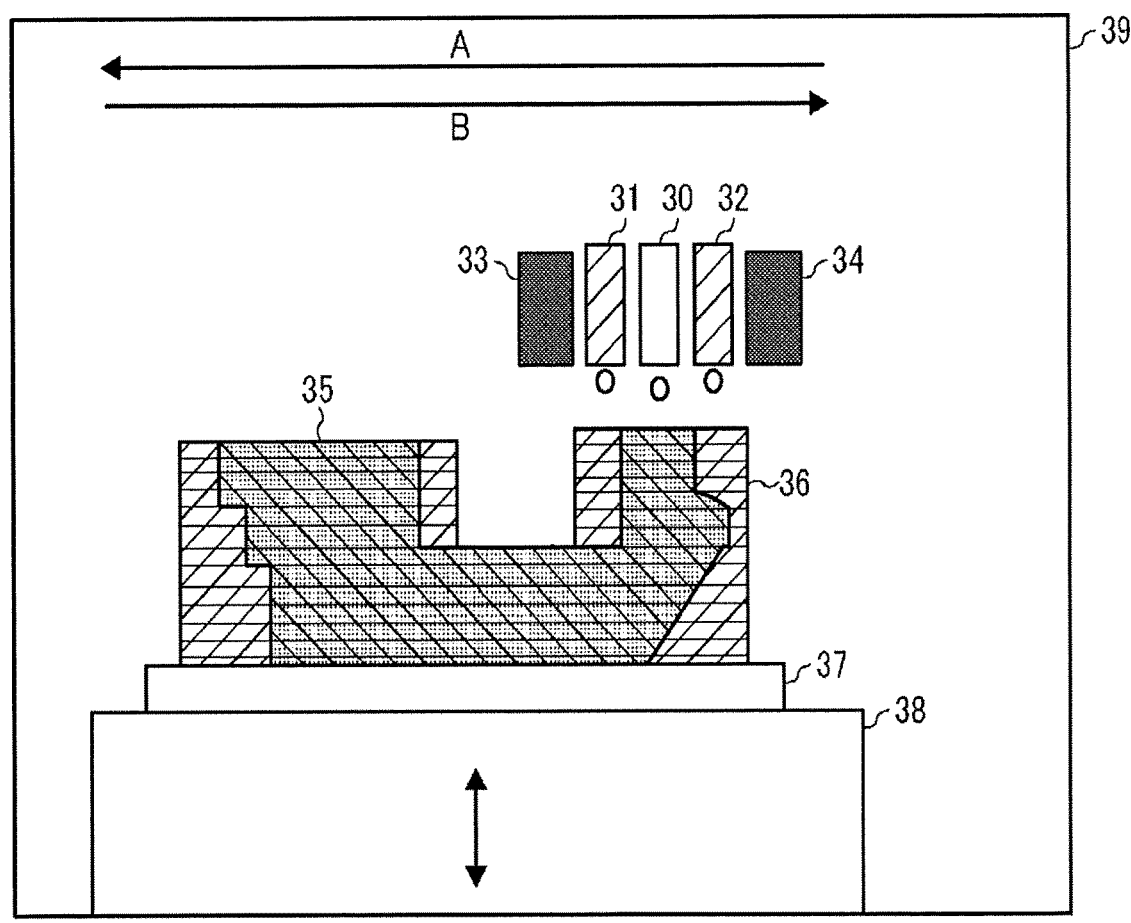
FIG. 2 is a schematic diagram illustrating an image forming apparatus (apparatus for fabricating a three-dimensional object) according to an embodiment of the present invention.
Figure 3A:
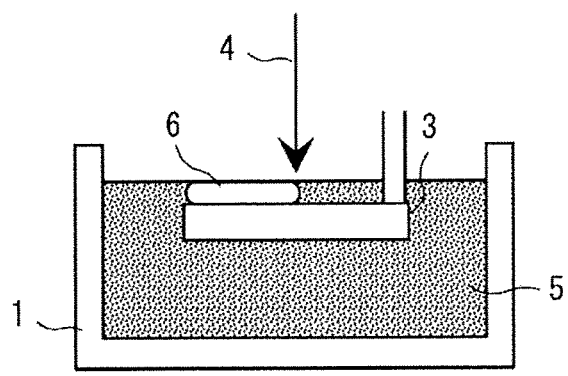
FIGS. 3A to 3D are schematic diagrams illustrating a method for fabricating a three-dimensional object by using an active energy ray curable composition according to an embodiment of the present invention.
Figure 3B:
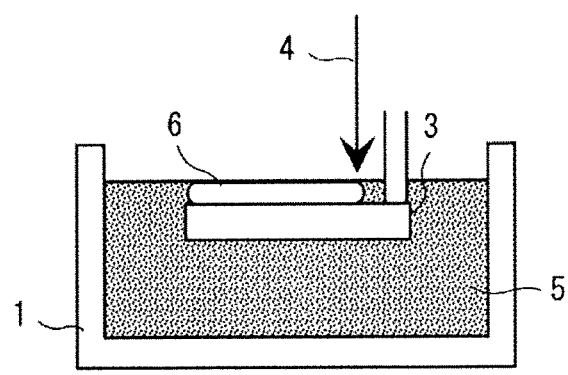
Figure 3C:
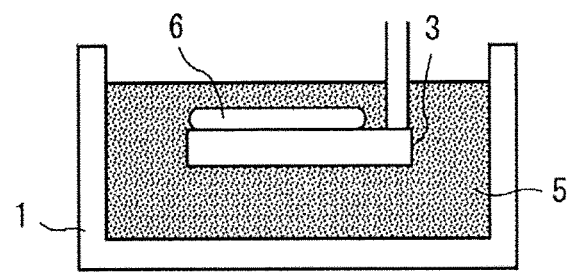
Figure 3D:
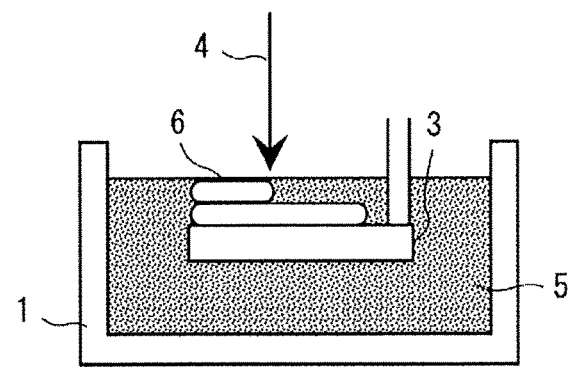

Furthermore, the active energy ray curable composition of the present embodiment can be used as an ink to form two-dimensional texts, images, and designed coating film on various substrates, and in addition as a three-dimensional object forming material to form a three-dimensional object. This three-dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active energy ray curable composition of the present embodiment one on top of the other by repeating discharging the active energy ray curable composition to particular areas followed by curing upon irradiation of an active energy ray (to be described in detail later). FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present embodiment with the active energy ray 4.

An apparatus for fabricating a three-dimensional object by the active energy ray curable composition of the present embodiment is not particularly limited and can be a known apparatus. For example, the apparatus includes a containing device, a supplying device, and a discharging device of the active energy ray curable composition, and an active energy ray irradiator.

In addition, the present embodiment includes cured materials obtained by curing the active energy ray curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

Composition Stored Container

The composition stored container of the present embodiment contains the active energy ray curable composition and is suitable for the applications as described above. For example, if the active energy ray curable composition of the present embodiment is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

Image Forming Method and Image Forming Apparatus

The image forming method of the present embodiment includes at least an irradiating step of irradiating the active energy ray curable composition of the present embodiment with an active energy ray to cure the active energy ray curable composition. The image forming apparatus of the present embodiment includes at least an irradiator to irradiate the active energy ray curable composition of the present embodiment with an active energy ray and a storing part containing the active energy ray curable composition of the present embodiment. The storing part may include the container mentioned above. Furthermore, the method and the apparatus may respectively include a discharging step and a discharging device to discharge the active energy ray curable composition. The method of discharging the active energy ray curable composition is not particularly limited, and examples thereof include a continuous jetting method and an on-demand method. The on-demand method includes a piezo method, a thermal method, an electrostatic method, etc.

FIG. 1 is a diagram illustrating an image forming apparatus equipped with an inkjet discharging device. Printing units 23a, 23b, 23c, and 23d respectively having ink cartridges and discharging heads for yellow, magenta, cyan, and black active energy ray curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or composite materials thereof, each of which may be in the form of a sheet. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present embodiment includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two-dimensional part and three-dimensional part) and a three-dimensional object can be fabricated.

FIG. 2 is a schematic diagram illustrating another example of the image forming apparatus (apparatus to fabricate a 3D object) of the present embodiment. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active energy ray curable composition, and ejection head units 31 and 32 for support and curing these compositions ejects a second active energy ray curable composition having a different composition from the first active energy ray curable composition, while ultraviolet irradiators 33 and 34 adjacent to the ejection head units 31 and 32 cure the compositions. To be more specific, for example, after the ejection head units 31 and 32 for support eject the second active energy ray curable composition onto a substrate 37 for additive manufacturing and the second active energy ray curable composition is solidified by irradiation of an active energy ray to form a first substrate layer having a storing pool for composition, the ejection head unit 30 for additive manufacturing ejects the first active energy ray curable composition onto the pool followed by irradiation of an active energy ray for solidification, thereby forming a first additive manufacturing layer. This step is repeated multiple times lowering a stage 38 movable in the vertical direction to laminate the supporting layer and the additive manufacturing layer to fabricate a solid object 35. Thereafter, an additive manufacturing support 36 is removed, if desired. Although only a single ejection head unit 30 for additive manufacturing is provided to the image forming apparatus 39 illustrated in FIG. 2, it can have two or more units 30.

EXAMPLES

Further understanding can be obtained by reference to certain specific examples which are provided herein for the purpose of illustration only and are not intended to be limiting.

Components of Active Energy Ray Curable Composition

Table 1 lists abbreviations, compound names, and manufacturer names of raw materials used to prepare active energy ray curable compositions.

Raw materials which were not commercially available were prepared by the methods described in Synthesis Examples 1 to 6. The synthesized compounds were identified by nuclear magnetic resonance spectroscopy (using an instrument JNM-ECX500 available from JEOL Ltd.). Purity thereof was measured by gas chromatography (using an instrument GCMS-QP2010 PLUS available from Shimadzu Corporation). These chemical analyses were performed by conventional methods.

TABLE 1

| | Abbreviations | Compound Names | Product Names and Manufacturer Names |
|---|---|---|---|
| Polymerizable Acrylamide Compound (A1) having Ester Structure and Molecular Weight of 150-200 | A1-1 | N-Acryloyl-N-methylglycine Methyl Ester (MW: 157.2) | (See Synthesis Example 1) |
| | A1-2 | N-Acryloyl-N-methylglycine Ethyl Ester (MW: 171.2) | (See Synthesis Example 2) |
| | A1-3 | N-Acryloyl-N-ethylglycine Ethyl Ester (MW: 185.2) | (See Synthesis Example 3) |
| | A1-4 | Methyl N-Acryloylpiperidine-4-carboxylate (MW: 197.2) | (See Synthesis Example 4) |
| Polymerizable Compound (A2) other than A1 | A2-1 | 2-Phenoxyethyl Acrylate | VISCOAT #192 from Osaka Organic Chemical Industry Ltd. |
| | A2-2 | Caprolactone-modified Dipentaerythritol Hexaacrylate | KAYARAD DPCA-60 from Nippon Kayaku Co., Ltd. |
| | A2-3 | Isobornyl Acrylate | IBXA from Osaka Organic Chemical Industry Ltd. |
| | A2-4 | Ethyl N-Acryloylpiperidine-4-carboxylate (MW: 211.3) | (See Synthesis Example 5) |
| | A2-5 | N-Methacryloyl-N-methylglycine Methyl Ester (MW: 171.2) | (See Synthesis Example 6) |
| | A2-6 | N-(Butoxymethyl)acrylamide (MW: 157.2) | Reagent from Tokyo Chemical Industry Co., Ltd. |
| Acylphosphine Oxide Polymerization Initiator (B1) | B1-1 | Phenylbis(2,4,6-trimethylbenzoyl)phosphine Oxide | IRGACURE 819 from BASF Japan Ltd. |
| | B1-2 | Diphenyl(2,4,6-trimethylbenzoyl)phosphine Oxide | IRGACURE TPO from BASF Japan Ltd. |
| Polymerization Initiator (B2) other than B1 | B2-1 | 2-Methyl-1-[4-(methylthio)phenyl]-2-morpholinopropane-1-one | IRGACURE 907 from BASF Japan Ltd. |
| | B2-2 | 2,4-Diethylthioxanthone | KAYACURE DETX-S from Nippon Kayaku Co., Ltd. |
| | B2-3 | 1-Hydroxycyclohexyl Phenyl Ketone | IRGACURE 184 from BASF Japan Ltd. |
| Other Components | Polymerization Inhibitor | 4-Methoxyphenol | Methoquinone from Seiko Chemical Co., Ltd. |
| | Surfactant | Silicone-based Surfactant | BYK-UV3510 from BYK Japan KK |

Synthesis Example 1

Synthesis of N-acryloyl-N-methylglycine Methyl Ester (A1-1)

First, 0.30 mol of N-methylglycine methyl ester hydrochloride (reagent available from Sigma-Aldrich Japan), 0.45 mol of potassium carbonate (reagent available from Kanto Chemical Co., Inc.), and 400 mL of water were stir-mixed at a temperature of 0° C. to 10° C., and 0.33 mol of acrylic acid chloride (reagent available from Wako Pure Chemical Industries, Ltd.) were thereafter gently dropped in the mixture while keeping the temperature. After completion of the dropping, the resulting mixture was subject to extraction three times using 400 mL of ethyl acetate (reagent available from Kanto Chemical Co., Inc.) and thereafter combined with the ethyl acetate layer, followed by one time of washing with 400 mL of water. The ethyl acetate was removed at 40° C. under reduced pressures. Thus, 0.20 mol of the target material, i.e., N-acryloyl-N-methylglycine methyl ester (A1-1), was obtained as a substantially colorless transparent liquid. The purity thereof was 98.3%.

The molecular weight thereof was 157.2. N-acryloyl-N-methylglycine methyl ester (A1-1) is a known compound (with CAS registry number 72065-23-7).

Synthesis Example 2

Synthesis of N-acryloyl-N-methylglycine Ethyl Ester (A1-2)

The procedure in Synthesis Example 1 was repeated except for replacing the N-methylglycine methyl ester hydrochloride with N-methylglycine ethyl ester hydrochloride (reagent available from Tokyo Chemical Industry Co., Ltd.). Thus, 0.22 mol of the target material, i.e., N-acryloyl-N-methylglycine ethyl ester (A1-2), was obtained as a substantially colorless transparent liquid. The purity thereof was 98.5%.

The molecular weight thereof was 171.2. N-acryloyl-N-methylglycine ethyl ester (A1-2) is a known compound (with CAS registry number 170116-05-9).

Synthesis Example 3

Synthesis of N-acryloyl-N-ethylglycine Ethyl Ester (A1-3)

The procedure in Synthesis Example 1 was repeated except for replacing the N-methylglycine methyl ester hydrochloride with N-ethylglycine ethyl ester hydrochloride. Thus, 0.25 mol of the target material, i.e., N-acryloyl-N-ethylglycine ethyl ester (A1-3), was obtained as a substantially colorless transparent liquid. The purity thereof was 98.0%.

The N-ethylglycine ethyl ester hydrochloride was quantitatively synthesized by acting N-ethylglycine (reagent available from Tokyo Chemical Industry Co., Ltd.) with twice molar amount of thionyl chloride in an excessive amount of ethanol at room temperature for whole day and night, and thereafter condensed under reduced pressures.

The molecular weight of the N-acryloyl-N-ethylglycine ethyl ester (A1-3) was 185.2. N-acryloyl-N-ethylglycine ethyl ester (A1-3) is a known compound (with CAS registry number 1179779-40-8).

Synthesis Example 4

Synthesis of Methyl N-Acryloylpiperidine-4-carboxylate (A1-4)

The procedure in Synthesis Example 1 was repeated except for replacing the N-methylglycine methyl ester hydrochloride with methyl piperidine-4-carboxylate (reagent available from Tokyo Chemical Industry Co., Ltd.). Thus, 0.25 mol of the target material, i.e., methyl N-acryloylpiperidine-4-carboxylate (A1-4), was obtained as a substantially colorless transparent liquid. The purity thereof was 98.6%.

The molecular weight thereof was 197.2. Methyl N-acryloylpiperidine-4-carboxylate (A1-4) is a known compound (with CAS registry number 845907-51-9).

Synthesis Example 5

Synthesis of Ethyl N-Acryloylpiperidine-4-carboxylate (A2-4)

The procedure in Synthesis Example 1 was repeated except for replacing the N-methylglycine methyl ester hydrochloride with ethyl piperidine-4-carboxylate (reagent available from Tokyo Chemical Industry Co., Ltd.). Thus, 0.27 mol of the target material, i.e., ethyl N-acryloylpiperidine-4-carboxylate (A2-4), was obtained as a substantially colorless transparent liquid. The purity thereof was 99.2%.

Although having an acrylamide group and an ester structure, ethyl N-acryloylpiperidine-4-carboxylate (A2-4) does not fall into the acrylamide compound (A1) of the present embodiment since the molecular weight thereof is 211.3.

Synthesis Example 6

Synthesis of N-Methacryloyl-N-methylglycine Methyl Ester (A2-5)

The procedure in Synthesis Example 1 was repeated except for replacing the acrylic acid chloride with methacrylic acid chloride (reagent available from Wako Pure Chemical Industries, Ltd.). Thus, 0.22 mol of the target material, i.e., N-methacryloyl-N-methylglycine methyl ester (A2-5), was obtained as a substantially colorless transparent liquid. The purity thereof was 97.2%.

Although having a molecular weight of 171.2 and an ester structure, N-methacryloyl-N-methylglycine methyl ester (A2-5) does not fall into the acrylamide compound (A1) of the present embodiment because of absence of acrylamide group.

N-(Butoxymethyl)acrylamide (A2-6)

As N-(butoxymethyl)acrylamide (A2-6), a commercially-available product (reagent available from Tokyo Chemical Industry Co., Ltd.) was used.

Although having a molecular weight of 157.2 and an acrylamide group, N-(butoxymethyl)acrylamide (A2-6) does not fall into the acrylamide compound (A1) of the present embodiment because of absence of ester structure.

Example 1

Preparation of Active Energy Ray Curable Composition

A1-1 in a mass content of 95.8%, B1-1 in a mass content of 4.0%, the polymerization inhibitor in a mass content of 0.1%, and the surfactant in a mass content of 0.1% (all listed in Table 1) were sequentially added together and stirred for 2 hours. After confirming that there was no dissolution residue by visual inspection, coarse particles were removed with a membrane filter. Thus, an active energy ray curable composition was prepared.

Examples 2 to 8 and Comparative Examples 1 to 6

The procedure in Example 1 was repeated except for changing the composition and the mass content (%) of each material to those described in Table 2. Thus, active energy ray curable compositions were each prepared.

TABLE 2

|  | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|
| A1-1 | 95.8 |  |  |  | 50.0 |  | 40.0 | 60.0 | 95.8 |  |  |  |  |  |
| A1-2 |  | 92.0 |  |  | 25.0 | 30.0 |  |  |  |  |  |  |  |  |
| A1-3 |  |  | 96.0 |  |  |  | 37.0 |  |  |  |  |  |  |  |
| A1-4 |  |  |  | 88.0 |  | 30.0 |  |  |  | 88.0 |  |  |  |  |
| A2-1 |  |  |  |  | 9.8 | 15.0 | 39.8 |  |  |  |  | 39.8 |  |  |
| A2-2 |  |  |  |  |  | 10.0 |  |  |  |  |  |  |  |  |
| A2-3 |  |  |  |  |  |  |  |  |  |  |  | 40.0 |  |  |
| A2-4 |  |  |  |  |  |  |  |  |  |  |  | 95.8 |  |  |
| A2-5 |  |  |  |  |  |  |  |  |  |  |  |  | 95.8 |  |
| A2-6 |  |  |  |  |  |  |  |  |  |  |  |  |  | 95.8 |
| B1-1 | 4.0 | 3.2 |  | 5.0 | 5.0 |  | 2.8 |  |  |  |  | 4.0 | 4.0 | 4.0 |

TABLE 2-continued

| | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|
| B1-2 | | 7.8 | | 10.8 | 10.0 | 5.0 | 20.0 | | | | 20.0 | | | |
| B2-1 | | | 0.3 | | | 4.0 | | | 4.0 | | | | | |
| B2-2 | | | 0.3 | 1.0 | | 0.8 | | | | 1.0 | | | | |
| B2-3 | | | | | | | | | | 10.8 | | | | |
| Polymerization Inhibitor | 0.1 | 0.1 | 0.1 | 0.1 | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 |
| A1/B1 | 24.0 | 11.8 | 30.0 | 8.1 | 5.0 | 6.0 | 2.0 | 34.6 | — | — | — | — | — | — |

Formation of Printed Image by Inkjet

A composition storage container made of plastic was filled with each active energy ray curable composition and installed in an image forming apparatus equipped with an inkjet head (MH5440 available from Ricoh Co., Ltd.) serving as a discharger, a UV-LED (LED ZERO available from Integration Technology Co., Ltd., providing a wavelength of 395 nm and an illuminance of 1.0 W/cm$^2$ on an irradiated surface) serving as an active energy ray irradiator, a controller for controlling discharging operations, and a supply channel extending from the composition storage container to the inkjet head. The inkjet head was appropriately temperature-controlled so that the viscosity of the active energy ray curable composition became 10 to 12 mPa·s. The active energy ray curable composition was ink-jetted on a commercially-available PET (polyethylene terephthalate) film (COSMOSHINE A4100 available from Toyobo Co., Ltd., having a thickness of 188 μm), that is a general-purpose film material, to have a film thickness of 10 μm, and thereafter irradiated with ultraviolet rays emitted from the UV-LED, thus obtaining a printed image. Multiple printed images were obtained by changing the ultraviolet irradiation time within the range of 0.1 to 5.0 seconds in a stepwise manner.

Evaluation of Printed Image

Determination of Amount of Light Required for Curing

The printed images were touched with fingers, in descending order in terms of ultraviolet irradiation time, to check liquid feeling or stickiness. An image in a dried state without either liquid feeling or stickiness was determined to have completed curing, and the amount (J/cm$^2$) of light required for curing was determined from the product of illuminance (1.0 W/cm$^2$) and irradiation time (sec). The results are presented in Table 3. The less the amount of light required for curing, the better the curability. Those having not cured even after 5.0 seconds of ultraviolet irradiation were determined to be non-curable.

Determination of Strength of Cured Product

The surface of each printed image, prepared with light in an amount of 1.0 J/cm$^2$, was slightly scratched with a cotton swab, and the state thereof was evaluated based on the following three-rank criteria. The results are presented in Table 3. Those having not cured with light in an amount of 1.0 J/cm$^2$ were impossible to evaluate. Those in the ranks A and B can be put into practical use.

A: No scratch mark is observed.
B: Scratch mark is slightly observed.
C: Scratch mark is clearly observed.

Determination of Odor of Composition

The level of odor felt by the operator during the inkjet discharge operation was evaluated based on the following three-rank criteria. The results are presented in Table 3. Those in the ranks A and B can be put into practical use.

A: Almost no odor is felt.
B: A slight odor is felt.
C: A strong odor is felt.

TABLE 3

| | | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|---|
| Evaluation Items | Amount of Light Required for Curing (J/cm$^2$) | 0.5 | 0.5 | 0.8 | 0.6 | 0.4 | 0.5 | 0.8 | 1.0 | Non-curable (>5.0) | Non-curable (>5.0) | 1.0 | 1.2 | Non-curable (>5.0) | 3.8 |
| | Strength of Cured Product | A | A | A | A | A | A | A | B | Non-evaluable | Non-evaluable | C | Non-evaluable | Non-evaluable | Non-evaluable |
| | Odor of Composition | A | A | A | A | A | A | B | A | A | A | C | A | A | A |

Embodiments of the present invention provide, for example, the following (1) to (25).

(1) A composition comprising: a polymerizable acrylamide compound (A1) having an ester structure and a molecular weight of from 150 to 200; and an acylphosphine oxide polymerization initiator (B1).

(2) The composition of above (1), wherein the ester structure of the acrylamide compound (A1) comprises a straight-chain or branched alkyl ester group having 1 to 4 carbon atoms.

(3) The composition of above (1) or (2), wherein the acrylamide compound (A1) is represented by the following formula (1) or (2):

$$CH_2=CH-CO-N(R^1)-R^2-CO-O-R^3 \quad \text{Formula (1)}$$

where R$^1$ represents a hydrogen atom or a straight-chain or branched alkyl group having 1 to 4 carbon atoms, R$^2$ represents a straight-chain or branched alkylene group having 1 to 4 carbon atoms, R$^3$ represents a straight-chain or branched alkyl group having 1 to 4 carbon atoms, and a total number of carbon atoms in $R^1$, $R^2$, and $R^3$ is in a range of from 2 to 6;

Formula (2)

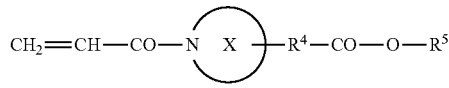

where a ring X represents a cyclic structure comprising a nitrogen atom and 2 to 5 carbon atoms, $R^4$ represents a single bond or a straight-chain or branched alkylene group having 1 to 3 carbon atoms, $R^5$ represents a straight-chain or branched alkyl group having 1 to 3 carbon atoms, and a total number of carbon atoms in the ring X, $R^4$, and $R^5$ is in a range of from 3 to 6.

(4) The composition of any one of above (1) to (3), wherein the acrylamide compound (A1) is an N-acryloyl-N-alkylamino acid alkyl ester or an N-acryloylpiperidine carboxylic acid ester.

(5) The composition of any one of above (1) to (4), wherein a mass content of the acrylamide compound (A1) is from 20.0% to 98.0% based on a total mass (100% by mass) of the composition.

(6) The composition of any one of above (1) to (5), wherein the acylphosphine oxide polymerization initiator (B1) is phenylbis(2,4,6-trimethylbenzoyl)phosphine oxide or diphenyl(2,4,6-trimethylbenzoyl)phosphine oxide.

(7) The composition of any one of above (1) to (6), wherein a mass content of the acylphosphine oxide polymerization initiator (B1) is from 1.0% to 20.0% based on a total mass (100% by mass) of the composition.

(8) The composition of any one of above (1) to (7), further comprising a polymerizable compound (A2) other than the acrylamide compound (A1).

(9) The composition of any one of above (1) to (7), further comprising at least one member selected from acrylic acid esters, methacrylic acid esters, urethane acrylate derivatives, urethane methacrylate derivatives, epoxy acrylate derivatives, epoxy methacrylate derivatives, N-vinyl compounds, aromatic vinyl compounds, vinyl ethers, allyl compounds, and acrylamide compounds comprising no ester structure.

(10) The composition of any one of above (1) to (9), further comprising a polymerization initiator (B2) other than the acylphosphine oxide polymerization initiator (B1).

(11) The composition of any one of above (1) to (9), further comprising at least one member selected from an α-aminoketone polymerization initiator, an α-hydroxyketone polymerization initiator, an oxime ester polymerization initiator, a thioxanthone polymerization initiator, a benzophenone polymerization initiator, and an acridone polymerization initiator.

(12) The composition of any one of above (1) to (11), further comprising at least one member selected from colorants, surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, and thickeners.

(13) The composition of any one of above (1) to (12), wherein a mass content of the acrylamide compound (A1) is from 5.0 to 30.0 times a mass content of the acylphosphine oxide polymerization initiator (B1).

(14) The composition of any one of above (1) to (13), wherein the composition comprises no organic solvent.

(15) The composition of any one of above (1) to (14), wherein the composition is curable upon irradiation with ultraviolet rays having a peak wavelength of 395 nm in an amount of 1.0 J/cm² or less.

(16) The composition of any one of above (1) to (14), wherein the composition is curable upon irradiation with ultraviolet rays having a peak wavelength of 395 nm in an amount of 1.0 J/cm² or less emitted from a UV-LED.

(17) A cured product obtained by curing the composition of any one of above (1) to (16).

(18) A storage storing the composition of any one of above (1) to (16).

(19) An image forming apparatus comprising: a storage storing a composition comprising: a polymerizable acrylamide compound (A1) having an ester structure and a molecular weight of from 150 to 200 and an acylphosphine oxide polymerization initiator (B1); a discharger to discharge the composition; and an irradiator to irradiate the discharged composition with an active energy ray.

(20) The image forming apparatus of above (19), wherein the discharger is an inkjet head.

(21) The image forming apparatus of above (19) or (20), wherein the irradiator is a UV-LED that emits ultraviolet rays having a peak wavelength of 395 nm.

(22) An image forming method comprising: discharging a composition comprising a polymerizable acrylamide compound (A1) having an ester structure and a molecular weight of from 150 to 200 and an acylphosphine oxide polymerization initiator (B1); and curing the discharged composition by irradiating the discharged composition with an active energy ray.

(23) The image forming method of above (22), wherein the composition is discharged by an inkjet head.

(24) The image forming method of above (22) or (23), wherein the discharged composition is cured by being irradiated with ultraviolet rays having a peak wavelength of 395 nm emitted by a UV-LED.

(25) A composition comprising a polymerizable acrylamide compound (A1) having an ester structure and a molecular weight of from 150 to 200, wherein the composition is curable upon irradiation with ultraviolet rays having a peak wavelength of 395 nm in an amount of 1.0 J/cm² or less emitted from a UV-LED.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A composition comprising:
   an acrylamide compound (A1) having an ester structure and a molecular weight of from 150 to 200; and
   an acylphosphine oxide polymerization initiator (B1),
   wherein the acrylamide compound (A1) is represented by the following formula (1) or (2):

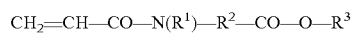  Formula (1)

where $R^1$ represents a hydrogen atom or a straight-chain or branched alkyl group having 1 to 4 carbon atoms, $R^2$ represents a straight-chain or branched alkylene group having 1 to 4 carbon atoms, $R^3$ represents a straight-chain or branched alkyl group having 1 to 4 carbon atoms, and a total number of carbon atoms in $R^1$, $R^2$, and $R^3$ is in a range of from 2 to 6;

Formula (2)

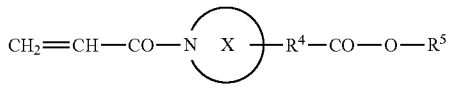

where a ring X represents a cyclic structure comprising a nitrogen atom and 2 to 5 carbon atoms, $R^4$ represents a single bond or a straight-chain or branched alkylene group having 1 to 3 carbon atoms, $R^5$ represents a straight-chain or branched alkyl group having 1 to 3 carbon atoms, and a total number of carbon atoms in the ring X, $R^4$, and $R^5$ is in a range of from 3 to 6, and
wherein
a mass content of the acrylamide compound (A1) is from 5.0 to 30.0 times a mass content of the acylphosphine oxide polymerization initiator (B1), and
the composition cures to form a surface wherein no mark is observed when scratched with a cotton swab upon irradiation with ultraviolet rays having a peak wavelength of 395 nm in an amount of 1.0 J/cm² or less emitted from a UV-LED.

2. The composition of claim 1, wherein the ester structure comprises a straight-chain or branched alkyl ester group having 1 to 4 carbon atoms.

3. The composition of claim 1, wherein the acylphosphine oxide polymerization initiator (B1) comprises at least one member selected from the group consisting of phenylbis(2,4,6-trimethylbenzoyl)phosphine oxide and diphenyl(2,4,6-trimethylbenzoyl)phosphine oxide.

4. The composition of claim 1, further comprising at least one member selected from the group consisting of acrylic acid esters, methacrylic acid esters, urethane acrylate derivatives, urethane methacrylate derivatives, epoxy acrylate derivatives, epoxy methacrylate derivatives, N-vinyl compounds, aromatic vinyl compounds, vinyl ethers, allyl compounds, and acrylamide compounds comprising no ester structure.

5. The composition of claim 1, further comprising at least one member selected from the group consisting of an α-aminoketone polymerization initiator, an α-hydroxyketone polymerization initiator, an oxime ester polymerization initiator, a thioxanthone polymerization initiator, a benzophenone polymerization initiator, and an acridone polymerization initiator.

6. The composition of claim 1, wherein the composition comprises no organic solvent.

7. A cured product obtained by curing the composition of claim 1.

8. An image forming apparatus comprising:
a storing part storing a composition according to claim 1:
a discharger to discharge the composition; and
an irradiator to irradiate the discharged composition with an active energy ray, wherein the composition is curable upon irradiation with ultraviolet rays having a peak wavelength of 395 nm in an amount of 1.0 J/cm² or less emitted from a UV-LED.

9. The image forming apparatus of claim 8, wherein the irradiator is a UV-LED that emits ultraviolet rays having a peak wavelength of 395 nm.

10. An image forming method comprising:
discharging a composition according to claim 1; and
curing the discharged composition by irradiating the discharged composition with an active energy ray, wherein the composition is curable upon irradiation with ultraviolet rays having a peak wavelength of 395 nm in an amount of 1.0 J/cm² or less emitted from a UV-LED.

11. The image forming method of claim 10, wherein the active energy ray is ultraviolet rays having a peak wavelength of 395 nm emitted from a UV-LED.

12. The composition of claim 1, wherein the acrylamide compound (A1) comprises at least one selecting from the group consisting of an N-acryloyl-N-alkylamino acid alkyl ester and an N-acryloylpiperidine carboxylic acid alkyl ester.

13. The image forming apparatus of claim 8, wherein the acrylamide compound (A1) comprises at least one selecting from the group consisting of an N-acryloyl-N-alkylamino acid alkyl ester and an N-acryloylpiperidine carboxylic acid alkyl ester.

14. The image forming method of claim 10, wherein the acrylamide compound (A1) comprises at least one selecting from the group consisting of an N-acryloyl-N-alkylamino acid alkyl ester and an N-acryloylpiperidine carboxylic acid alkyl ester.

* * * * *